United States Patent [19]

Shorr

[11] 3,974,987

[45] Aug. 17, 1976

[54] CASCADE EFFECT BLOWN FLAP

[75] Inventor: Melvin Shorr, Marina del Rey, Calif.

[73] Assignee: Northrop Corporation, Los Angeles, Calif.

[22] Filed: May 7, 1975

[21] Appl. No.: 575,163

[52] U.S. Cl. .......................................... 244/42 CC
[51] Int. Cl.² ......................................... B64C 21/04
[58] Field of Search....... 244/42 CC, 42 CD, 42 CF, 244/42 D, 42 DA, 42 DB; 416/20, 90 A; 415/DIG. 1; 114/66.5 H

[56] References Cited
UNITED STATES PATENTS

| | | | |
|---|---|---|---|
| 2,406,917 | 9/1946 | Stalker | 244/42 CC |
| 2,444,293 | 6/1948 | Holt | 244/42 DB |
| 3,009,668 | 11/1961 | Nystrom | 244/42 CC |
| 3,188,021 | 6/1965 | Young | 244/42 CC |
| 3,831,886 | 8/1974 | Burdges et al. | 244/42 CC |

FOREIGN PATENTS OR APPLICATIONS

| 81,338 | 7/1963 | France | 244/42 CC |
|---|---|---|---|

*Primary Examiner*—Stephen G. Kunin
*Assistant Examiner*—Barry L. Kelmachter
*Attorney, Agent, or Firm*—Willard M. Graham; William W. Rundle

[57] ABSTRACT

A control airfoil such as a wing flap is provided adjacent its leading edge with a plurality of parallel blowing slots extending spanwise of the flap and leading from a plenum in the interior of the flap, the plenum being supplied with high pressure air and the slots being so arranged in airtight relationship with the trailing edge of the wing that the slots are serially uncovered in a cascade arrangement, as the flap is deflected continuously downward from its neutral position, to blow a cascade of high pressure air rearwardly in successively small angle increments over the upper surface of the flap to continuously re-energize the boundary layer air thereon and thereby increase the coefficient of lift during landing of the aircraft by permitting extreme flap angles to be used.

2 Claims, 6 Drawing Figures

3,974,987

CASCADE EFFECT BLOWN FLAP

BACKGROUND OF THE INVENTION

High lift devices such as blown wing flaps in aircraft are well known in the aerodynamic arts.

Generally, the conventional type blown wing-flap employs a single narrow opening or slot to blow a sheet of high velocity air tangentially over the upper surface of a deflected flap to energize the flap boundary layer and, with the aid of the well-known Coanda Effect, causes the flow of air to follow the leading edge upper-surface flap contour in a laminar fashion to a reasonable flap angle (about 45°) before local flow separation occurs causing buffeting. The single slot also reduces buffeting intensity due to local flow separation, to a minimum, at normal full flap angles, i.e., angles up to about 60°.

A typical example of such a flap is disclosed in U.S. Pat. No. 2,920,844 granted Jan. 12, 1960 to P. L. Marshall et al. However, this type of flap, which employs only a single energizing slot can be deflected only about 60° or less and still maintain relatively tolerable flow.

Other examples of blown flaps such as those disclosed in U.S. Pat. No. 3,259,341 dated July 5, 1966 to R. H. Steidl, and U.S. Pat. No. 3,790,107 dated Feb. 5, 1974 to J. H. Renshaw employ one or more localized nozzle-like devices to blow air over the flap surface but again are severely limited in effectiveness as the flap is deflected to angles greater than 60°. The latter patent appears to be more applicable to a symmetrical control surface, since it shows upper and lower surface blowing slots to improve flow for either direction of deflection.

Thus the severe buffeting encountered in aircraft equipped with standard flaps during large flap deflections is created by local flow separation over the flap. This produces an aft-moving turbulent wake which then traverses the horizontal tail, causing undesirable and unsteady flow over the horizontal tail and/or longitudinal control surface motion which causes the airplane to buffet (shake) appreciably. Under these generally adverse conditions, the primary aerodynamic increment is more drag but with little or no increase in lift, which steepens the approach angle but does little or nothing to reduce approach speed.

It is therefore a desirable objective to substantially reduce or eliminate buffeting and also obtain more lift, by washing or blowing high velocity air over a flap by sequentially uncovering additional spanwise slots as the flap moves down. Therefore, a droop or deflection angle range greater than 60°, preferably up to 90°, can be used because the gradual step and angle blowing, increases in a cascade effect the volume of high pressure air blown increasing in proportion to the flap angle, thereby preventing flow break-away, from a nominal or minimum amount when the flap is at zero or neutral position to a maximum amount where the flap is at its maximum angle of 90°. Thus a flap angle of 90° can be employed to produce a substantial increase in coefficient of lift, in addition to the drag increase thereby resulting in a substantial decrease in approach and landing speeds with little or no buffeting. By modulating the amount of blowing, at constant flap angle of 80° for example, from zero flow, will result in high drag and low lift. Maximum blowing will result in much higher lift. This air modulation gives the pilot the option of independently (within limits) controlling approach path angle and approach speed. Such a system obviously will enable a naval pilot, for example, to exercise more precise control of high aircraft with respect to touching down at the optimum point on the carrier by permitting last minute corrections to compensate for changing winds and carrier motions in rough seas.

To this end, it is a primary object of my invention to provide a self contained cascade effect blown flap with a minimum of moving parts that is effective over its entire range including 60° to 90° of flap deflection with little or no buffeting and with a consequent appreciable reduction of landing speed which will be determined by the pressure and volume of air fed into the system.

It is a further object of my invention to provide a cascade effect blown flap that blows high velocity air increasing in volume as the flap deflection angle increases.

It is a still further object of my invention to provide a cascade effect blown flap that is relatively simple in construction, reliable in operation, and relatively inexpensive to manufacture.

It is still another object of my invention to provide a cascade effect blown flap that can be applied with equal facility to jet powered commercial as well as military aircraft.

Other objects and advantages inherent in the blown flap will readily be understood in the ensuing detailed description and drawings.

SUMMARY OF THE INVENTION

Briefly, the cascade effect blown flap of my invention is provided with a series of parallel span-wise extending blowing slots adjacent its leading edge, the slot passages being defined by curved vanes leading to the exterior surface of the flap from a plenum inside the flap, the plenum being supplied with high pressure air from a suitable source; preferably engine compressor bleed air. As the flap is deflected or drooped downwardly at an angle relative to an aircraft wing to which the flap is mounted, the blowing slots are progressively uncovered, one after another, so that the volume of the cascade of high pressure air issuing from the slots, to wash or blow over the upper surface of the flap, increases as additional blowing slots are uncovered as the angle of flap deflection increases.

The flap may be modified by adding an additional blowing slot, at about 66% aft relative to the leading edge of the flap chord to further augment the cascade of air blown from the leading edge slots, thus re-energizing the upper surface boundary layer, should separation start, determined by wind tunnel tests, at this point.

A still further modification of the blown flap, as will be described and shown, provides a flap trailing edge slot supplied with high pressure air from the same source as the leading edge slots, the trailing edge slot operating to open at a predetermined higher pressure than that required by the cascade flow, to define a jet flap for an additional increment of lift.

DESCRIPTION OF THE INVENTION

Figure 1:
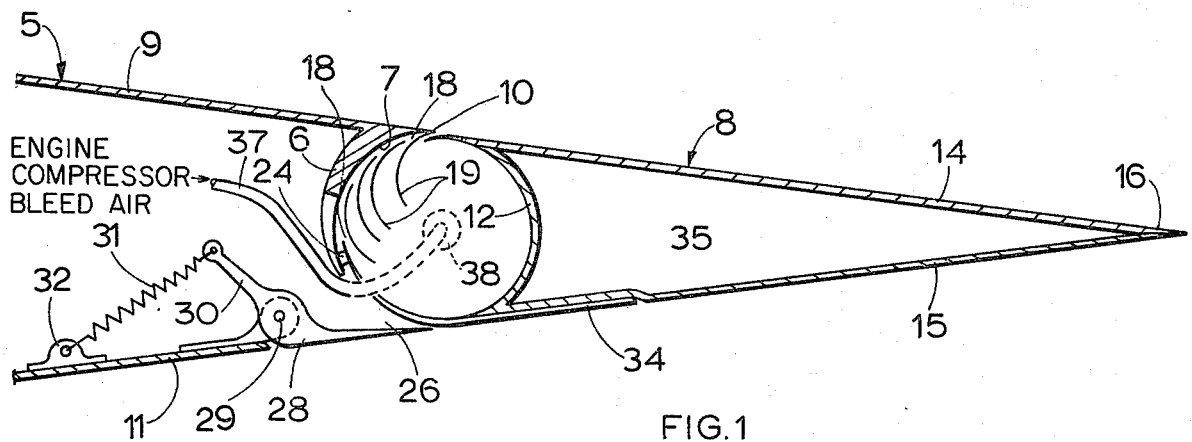
FIG. 1 is a diagrammatic cross-sectional view showing one preferred embodiment of the cascade effect blown flap of my invention.
Figure 2:
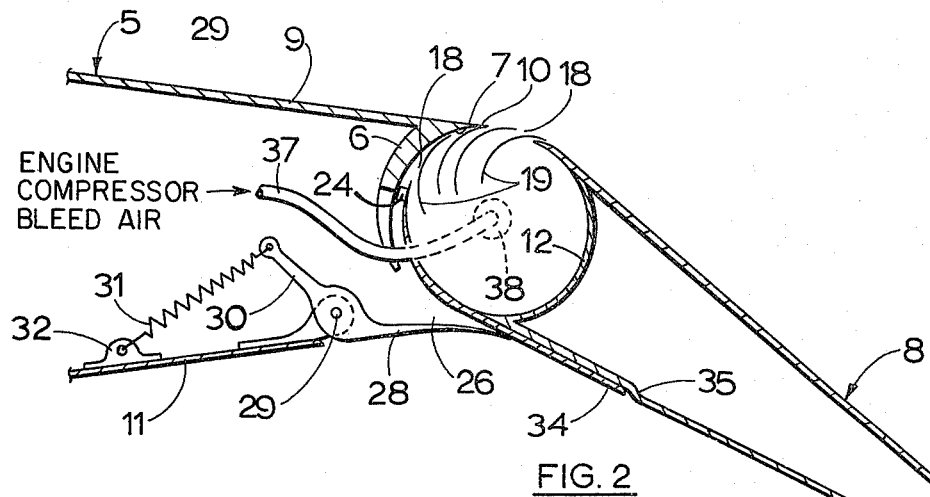
FIG. 2 is a diagrammatic cross-sectional view of the blown flap of FIG. 1 deflected at an angle of 30°.
Figure 4:
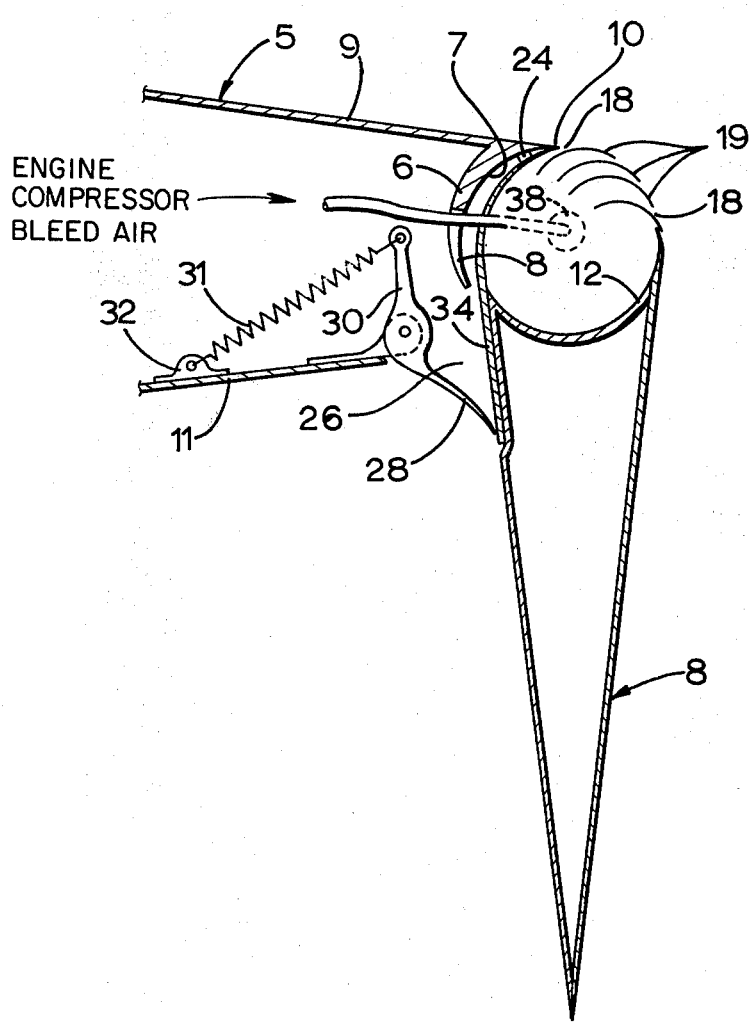
FIG. 4 is a diagrammatic cross-sectional view of the blown flap of FIG. 1 deflected at an angle of 90°.

As shown in the Figures the trailing edge of a generally conventional aircraft wing 5 is constructed to include a spar-like member 6 curved to define an arcuate plane 7 partially enclosing the wing interior and coextensive with the blown flap 8 of my invention. The arcuate plane 7 of member 6 is formed to provide a recess within which the leading edge of the flap 8 is pivotally mounted to move or deflect, relative to the wing 5, from neutral or 0° position, as shown in FIG. 1, to full deflection greater than 60° and up to 90° for example, as shown in FIG. 4. The leading edge of the flap 8 is complementally shaped to form a sealable interface with the arcuate plane 7, substantially as shown.

The upper surface 9 of the wing terminates in a thin, sharp cusp-like edge 10 extending an appropriate distance aft beyond the underlying lower wing surface 11 and overlying the arcuate planar surface 7 to permit full deflection of the flap 8.

The slotted portion of the flap 8 adjacent its leading edge encloses a plenum 12 preferably formed by a partially enclosed cylinder fabricated of sheet metal, or cast as part of the flap structure, to which upper and lower flap skins 14 and 15 respectively are fastened and sealed in any convenient manner, the skins extending aft and converging to a conventional tapered trailing edge 16. Structural details of internal bracing or reinforcing flap structure, other than the plenum 12 are omitted from the drawing since such structure is well-known in the airframe arts.

Around the periphery of the flap 8 adjacent its leading edge, opposite the arcuate plane 7 of spar member 6' a number of span-wise blowing slots 18 coextensive with the flap and plenum 12 therein, are provided being defined between discrete fixed curved blades or vanes 19 mounted across the opening in plenum 12 and secured at each end thereof in end seals or structure (not shown) covering the ends of plenum 12.

The vanes 19 preferably are formed of a high-strength, resilient metal such as stainless steel and can be anchored at each end of the plenum 12 in a manner similar to that employed in conventional turbine blade assembly practice. Since the vanes 19 will be subjected to air pressures in order of 25 p.s.i. producing exit velocities of about 1000 ft/sec. it may be necessary to install reinforcement members or braces (not shown) between the vanes 19 at one or more intervals between each end of the plenum if the length and resilience of the vanes 19 so dictate. This expedient, however, presents no unusual structural problem.

Referring to the Figures, and in particular to FIG. 1, the upper surface 9 of the wing 5 extends rearwardly terminating with a sharp edge or cusp 10 adjacent the uppermost vane 19, the succeeding vanes being recessed and covered within the arcuate plane 7 in the trailing edge of the wing 5.

Regardless of how the slotted leading edge of the blown flap 8 conforms to the arcuate surface 7 of the wing trailing edge, it is preferred to seal the clearance between the arcuate plane 7 and flap leading edge below the lowermost slot 18 in order to prevent high pressure air from entering the wing cavity. This is very simply accomplished by means of a continuous sealing strip 24 of durable, wear resistant material mounted coextensive with the flap 8 and bonded or otherwise affixed either to the arcuate surface 7 or to the leading edge of the flap 8, whichever is most convenient.

Thus it will be seen in FIG. 1 that when the flap 8 is at zero° setting, only the uppermost blowing slot is open to atmosphere and operative. The covered slots should leak very little air to the outside, until they are uncovered, because of the extremely close tolerance that can be maintained, tolerating a slight amount of rubbing, between each slot upper exit vane and the trailing edge 10 of the wing structure.

As noted above, the lower surface 11 of the wing terminates an appropriate distance forward of the upper wing surface 9 to permit full deflection, i.e., up to 90°, of the flap. To close the space 26 between the lower wing surface 11 and the lower portion of the flap leading edge, a relatively thin resilient closure plate 28, fabricated of stainless steel for example, is mounted along with the rear edge of the wing structure coextensive with the flap, to pivot around a hinge 29. The plate 28 extends rearwardly with the trailing edge thereof bearing in airtight relationship against the lower surface of the flap 8 immediately below the flap leading edge. Although the plate 28 is relatively resilient, it should be free to flex or bend a certain amount so that during any deflection of the flap 8 from 0° setting, the plate can pivot on hinge 29 and maintain an airtight relationship therewith. To this end the inner edge of the plate 28 is provided with one or more levers 30 (one being shown) to which a spring 31, having its other end fastened to a lug 32 mounted on the inside of the wing, is anchored.

Figure 3:
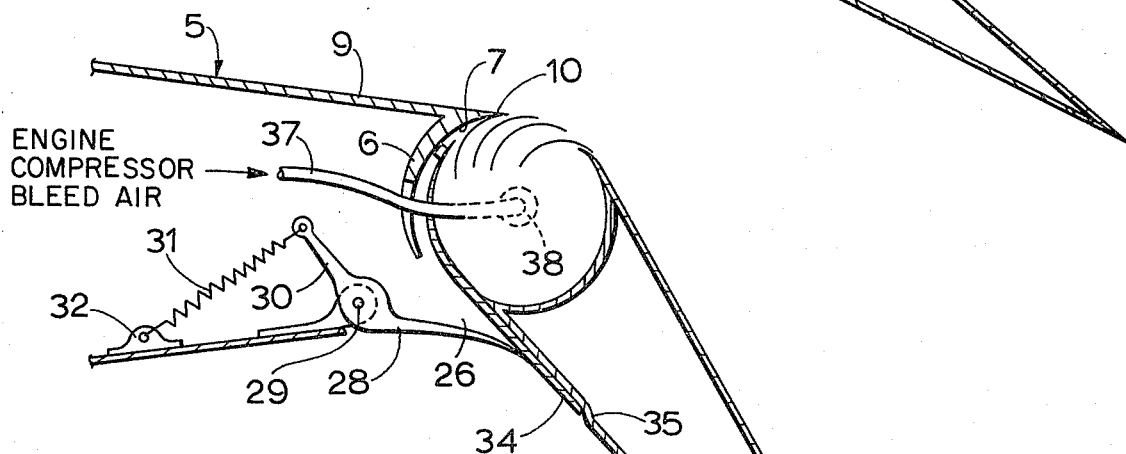
FIG. 3 is a diagrammatic cross-sectional view of the blown flap of Figure deflected at 60°.

Thus, it will be seen that the closure plate 28 moves against the spring load, and downwardly in unison with deflection of the flap 8, and plate 28 additionally flexing or bending a limited amount to bridge the space 26 between the trailing edge of the wing 5 and flap 8 to provide a continuous, gently curved, aerodynamically smooth surface throughout all flap deflections, typically as shown in FIGS. 3 and 4.

Since the plate 28 is spring-loaded to bear against the lower surface 15 of the flap 8 it is preferred to provide a friction plate 34 of any suitable wear-resistant material on the lower surface of the flap, as shown, the friction plate 34 either being flush mounted over the flap skin within a joggle 35 provided at one end thereof, the other end being appropriately formed around the lower curvature of the planeum 12 or, alternatively, appropriately fabricated to define the lower portion of the plenum 12, whichever construction conforms to preferred aircraft manufacturing practice.

Because conventional flap operating equipment and control mechanism for movement of the flap is well known to those skilled in the art, and forms no part of my invention, such equipment is intentionally omitted from the drawings. It could for example be any simple conventional system which requires flap actuation about only a single center of rotation.

High pressure air is bled from a suitable compressor stage of the engine (not shown) and supplied to the plenum 12 through one or more suitable conduits or air duct 37 and connected to the inlet connectors 38 (somewhat as shown in dotted lines) mounted in the end caps at each end of the plenum 12. Suitable valves (not shown) controlled by the pilot, or a suitable automatic system if found desirable for certain applications, may be connected into the air ducts 37 between the compressor and plenum 12, in convenient locations, to control or modulate the volume or flow of air during certain flight maneuvers, or to shut off the air when use of the blown flap 8 is unnecessary.

Obviously a portion of the air ducts 37, at least in the vicinity of the plenum inlets, must either be flexible or provided with swivel fittings (not shown) so that full, free deflection of the flap 8 is unimpeded.

Figure 5:
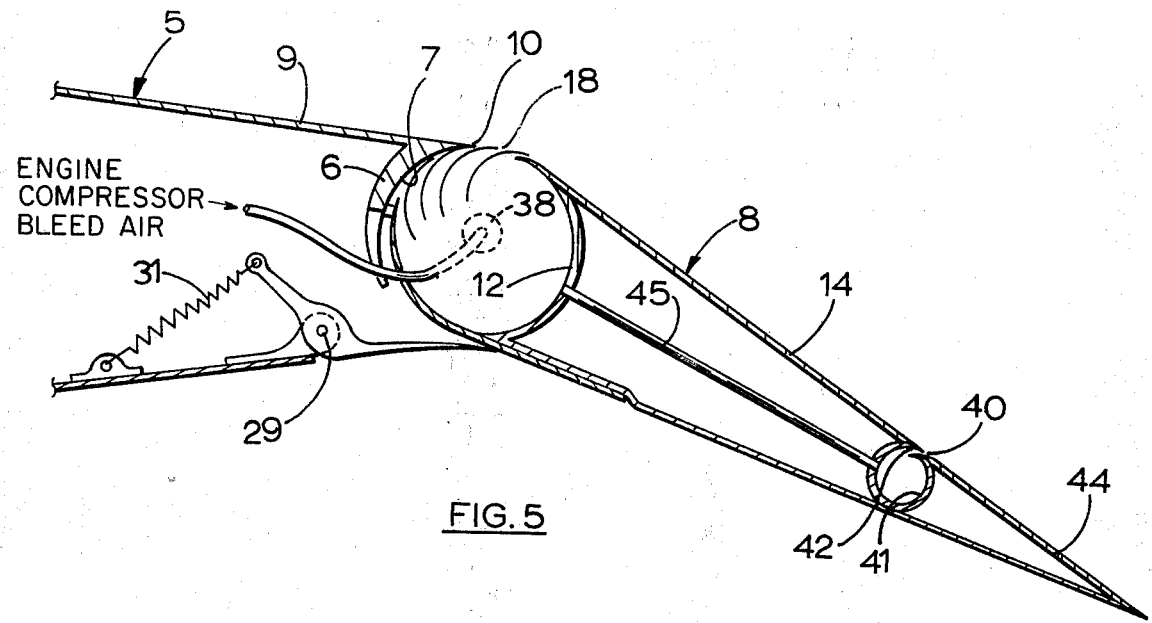
FIG. 5 is a diagrammatic cross-sectional view showing a modification of the blown flap of FIG. 1, to provide additional reenergizing of the aft third of the flap if wind tunnel tests show this is needed.

Deflection of the flap 8 from neutral, as shown in FIGS. 3–5, increases, in discrete angular steps, the volume of high pressure air blown over the upper flap surface, as the blowing slots 18 are sequentially uncovered to continuously re-energize the boundary layer air through all angles of flap deflection up to maximum. By so staging and curving the slot vanes 19, gradually, the effect of increasing energy boost on the air flow as each stage is uncovered at high flow rates, and aided by the Coanda Effect, causes the high pressure blown air to continually re-energize and stabilize the boundary layer air which will cling to the upper flap surface 14 at all deflection angles, producing thereby not only more drag but a substantially greater lift-coefficient.

A modification of the blown flap 8 is shown in FIG. 5, wherein a secondary blowing slot 40 is provided, located on the upper surface 14 of the flap 8, aft of the leading edge at a point approximately two-thirds of the flap chord between the leading and trailing edge thereof.

The construction of the secondary blowing slot 40 can be similar to that shown for the primary leading edge slots 18 shown in FIG. 1, wherein a partially enclosed plenum 41 is formed generally cylindrical, the cylinder wall being shaped to define a curved slot outlet 42 between an upper curved portion 43 faired into the upper forward flap skin 14 and a lower curved portion 44 faired into the aft section of the flap skin.

High pressure air for the secondary blowing slot 40 preferably is supplied to the secondary slot plenum 41 from the primary plenum 12 by one or more air ducts 45, (one being shown), connected in the wall of the plenum 41. Use of the supplemental slot 40 is of course optional, and could be resorted to in the event flow breakdown is found to occur near the top rear of the flap.

While for purposes of illustration I have shown the secondary blowing slot 40 location at a point two-thirds of the flap chord between the leading and trailing flap edges, it will be understood by those skilled in the aerodynamic arts that the precise location preferably will be empirically determined in wind tunnel tests to be the point at which boundary layer break-away is likely to occur, and the blown air therefrom should re-energize the remaining aft upper flap surface boundary layer if found to be necessary thereby maintaining ideal flow and a high lift coefficient at extreme flap deflections.

Figure 6:
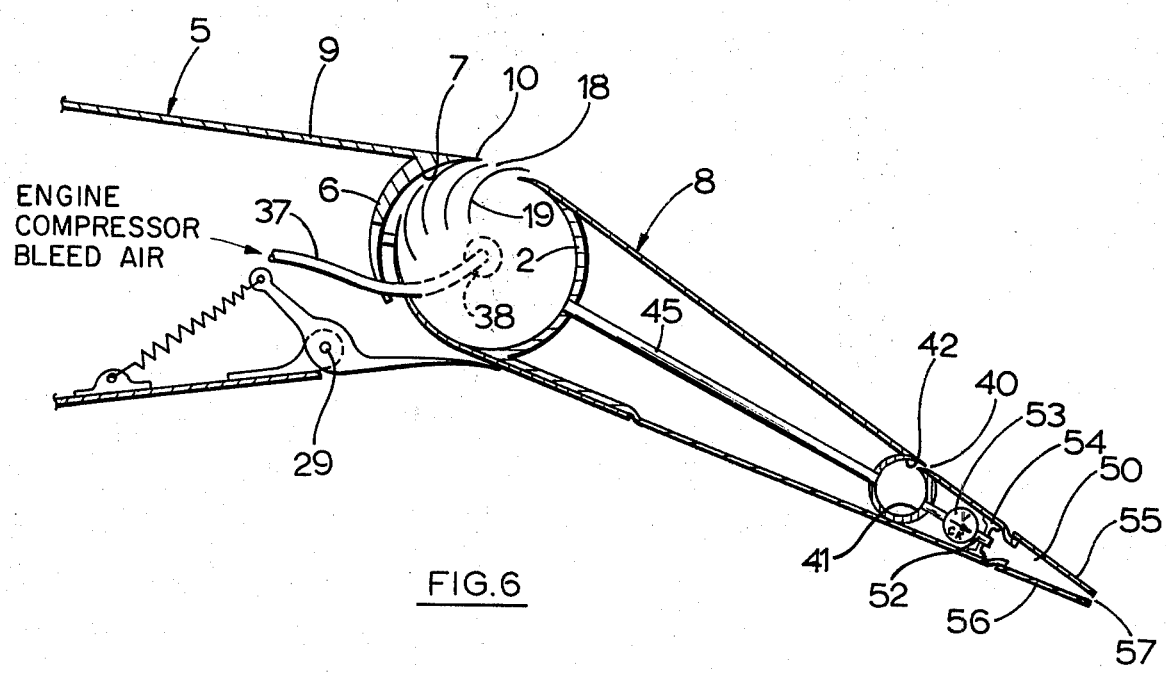
FIG. 6 is a diagrammatic cross-sectional view showing a further modification of the blown flap of FIG. 5, to provide a jet flap action to result in even higher lift coefficient.

A still further modification of the blown flap of my invention, as shown in FIG. 6, is an extreme far aft triangular manifold or plenum 50 bounded by a sealed span-wise spar 54 and the upper and lower springy preloaded surface skins 55 and 56 respectively, terminating in a normally closed blowing slot 57.

High pressure air can be supplied to the triangular plenum from the secondary plenum 41 through one or more air ducts 52 (one being shown) connected therebetween, through pre-loaded checkvalves 53 to cause the jet flap to open when sufficiently high pressure air is available to obtain an additional lift increment. This higher pressure can be set-in either manually by the pilot or automatically to cause the additional jet flap action.

It will be well understood to those skilled in the art that it may be necessary to install in the primary and secondary plenums, air distribution devices such as baffles, vanes, or partitions to obtain maximum uniformity and distribution of the high pressure air flow issuing from the blowing slots. For specific blowing flap designs, the exact configuration for ideal plenums and flow distribution means, are well understood expedients to those skilled in the art. Such designs can only be dictated by empirical determination, and are not considered to fall within the specific scope of my invention as claimed hereinafter.

It will further be understood that the foregoing embodiments of the cascade-effect blown flap are applicable to jet powered aircraft wherein high pressure air is readily available from the engine compressor, and are equally applicable to propeller driven aircraft wherein the high pressure air can be supplied by an engine-driven air compressor or other suitable conventional apparatus for compressing air.

It will still further be understood by those skilled in the art that the spirit and gist of the cascade-effect blown flap described above, in its several embodiments and modifications, can also be applied to aircraft control surfaces in combination with fixed aricraft control members other than the wings, operating in both directions if necessary such applications being deemed to fall within the scope of my invention.

Moreover, it will be understood by those acquainted with the art, that while I have described and shown the cascade-effect blown flap of my invention applied to a flap that can be deflected to angles greater than 60° relative to the wing, my invention can be effectively used where the limit of flap deflection is normal, i.e., approximately 60°, in aircraft of current design.

I claim:

1. An aircraft wing and trailing edge cascade-effect blowing flap combination comprising:
    a. an aircraft wing having a trailing edge adapted to mount a blowing flap within a sealable recess provided therein, said flap being deflectable downwardly from a neutral position relative to said wing to a deflection angle substantially greater than 60° thereto,
    b. means connecting the interior of said flap to a source of high pressure air,
    c. a plurality of blowing means in said flap operable to blow a cascade of high pressure air from the interior of said flap rearwardly over the upper surface thereof, and arranged in series to incrementally increase the volume of said high pressure air as said flap is deflected from said neutral position to said deflection angle greater than 60°, and an additional blowing slot in the trailing edge thereof between upper and lower springy, preloaded surface skins terminating in a normally closed slot, said slot being operable to open when the high pressure air in said flap exceeds a predetermined value, to blow said high pressure air therethrough to define a jet flap.

2. An aircraft wing and trailing edge cascade-effect blowing flap combination comprising:
   a. an aircraft wing having a portion of its trailing edge constructed to define a substantially air tight generally arcuate planar surface, the upper surface of said wing extending rearwardly beyond the lower surface of said wing and terminating in a relatively thin edge overlying said arcuate planar surface,
   b. a flap pivotally mounted on said wing to deflect downwardly with respect to said wing, the leading edge of said flap being recessed in said arcuate planar surface and complementally shaped to form a mutually sealable surface therewith,
   c. enclosure means defining a plenum in the interior of said flap adjacent the leading edge thereof,
   d. flexible duct means connecting said plenum to a source of high pressure air,
   e. a plurality of spanwise extending blowing slots arranged in parallel series adjacent the leading edge of said flap and communicating with the interior of said plenum, the major portion of said slots underlying said edge on the trailing upper surface of said wing,
   f. a seal mounted between said arcuate planar surface and said leading edge of said flap below said slots, and
   g. flexible sealing means between said flap and the lower surface of said wing, whereby said blowing slots are serially uncovered by said edge on the upper surface of said wing as said flap is deflected downwardly to incrementally increase the volume of high pressure air blown in a cascade from said slots as said flap is deflected to its maximum angle of deflection relative to said wing.

* * * * *